United States Patent
Yoo et al.

(10) Patent No.: US 6,690,433 B2
(45) Date of Patent: Feb. 10, 2004

(54) ELECTROSTATIC DAMAGE PREVENTING APPARATUS FOR LIQUID CRYSTAL DISPLAY

(75) Inventors: Soon-Sung Yoo, Kyoungsangbuk-do (KR); Dong-Yeung Kwak, Taegu-shi (KR); Hoo-Sung Kim, Seoul (KR); Yu-Ho Jung, Kyoungsangbuk-do (KR); Yong-Wan Kim, Kyoungsangbuk-do (KR); Dug-Jin Park, Taegu-shi (KR); Woo-Chae Lee, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 122 days.

(21) Appl. No.: 09/923,326

(22) Filed: Aug. 8, 2001

(65) Prior Publication Data

US 2002/0018154 A1 Feb. 14, 2002

(30) Foreign Application Priority Data

Aug. 8, 2000 (KR) ........................ P2000-45942

(51) Int. Cl.$^7$ .............................................. G02F 1/1333
(52) U.S. Cl. ........................................................ 349/40
(58) Field of Search ........................ 349/40, 192, 139, 349/143; 324/770; 257/59

(56) References Cited

U.S. PATENT DOCUMENTS

| | | | | |
|---|---|---|---|---|
| 5,373,377 A | * | 12/1994 | Ogawa et al. | 349/40 |
| 5,504,348 A | * | 4/1996 | Yoshida et al. | 257/59 |
| 5,606,340 A | * | 2/1997 | Suzuki et al. | 345/87 |
| 5,619,222 A | * | 4/1997 | So | 345/87 |
| 5,652,632 A | * | 7/1997 | Shimizu | 349/40 |
| 5,671,026 A | * | 9/1997 | Shiraki et al. | 349/40 |
| 5,909,035 A | * | 6/1999 | Kim | 257/59 |
| 6,157,166 A | * | 12/2000 | Odaohhara et al. | 320/121 |
| 6,388,719 B1 | * | 5/2002 | Matsunaga et al. | 349/40 |
| 6,448,747 B1 | * | 9/2002 | Lestician | 323/276 |

* cited by examiner

Primary Examiner—Kenneth Parker
(74) Attorney, Agent, or Firm—Morgan Lewis & Bockius LLP

(57) ABSTRACT

An electrostatic damage preventing apparatus for a thin film transistor array of a liquid crystal display includes a horizontal ground voltage line disposed at a first perimeter portion of the thin film transistor array, a vertical ground voltage line disposed at a second perimeter portion of the thin film transistor array, and a first electrostatic damage-preventing switching device group including parallel connection of at least two electrostatic damage-preventing switching devices to divide and divert an electrostatic voltage applied over the horizontal ground voltage line.

22 Claims, 2 Drawing Sheets

ELECTROSTATIC DAMAGE PREVENTING APPARATUS FOR LIQUID CRYSTAL DISPLAY

The present invention claims the benefit of Korean Patent Application No. P2000-45942 filed in Korea on Aug. 8, 2000, which is hereby incorporated by reference.

BACKGROUND OF THE INVENTION

1. Field of the Invention

The present invention relates to a liquid crystal display device, and more particularly, to an electrostatic damage preventing apparatus for a liquid crystal display.

2. Description of the Related Art

Generally, a liquid crystal display (LCD) controls light transmissivity of liquid crystal cells in response to a video signal, thereby displaying an image. An active matrix LCD provided with a switching device for each liquid crystal cell is suitable for displaying moving images. A thin film transistor (TFT) is generally used as the switching device.

An active matrix LCD displays images corresponding to input video signals. Each pixel of the active matrix LCD includes a liquid crystal cell that controls the quantity of transmitted light according to a data signal voltage level input from the data line. A TFT is arranged at each intersection between gate lines and data lines. The data line will switch a data signal delivered to the liquid crystal cell in response to a scanning signal (i.e., a gate signal) from the gate line.

In an active matrix LCD as shown in FIG. 1, an electrostatic damage preventing apparatus, hereinafter referred briefly to as "ESD preventing apparatus," for protecting a liquid crystal display panel from static electricity produced during the cutting of the substrate is provided at the liquid crystal display panel.

Referring to FIG. 1, the conventional ESD preventing apparatus includes a plurality of switching devices for ESD prevention that are provided on a TFT array 13 of a liquid crystal display panel 1. The TFT array 13 has liquid crystal cells that respond to an electric field in order to control a quantity of transmitted light and thin film transistors (TFT's) 4 that respond to gate signals on gate lines 2 to selectively connect data lines 3 to liquid crystal cells 5. The ends of the gate line 2 and the data line 3 are provided with pads 8 and 9, respectively. The pad 8 provided at the end of the gate line 2 receives a gate signal from a gate driver (not shown) while the pad 9 provided at the end of the data line 4 receives a data signal from a data driver (not shown).

The ESD preventing apparatus further includes a ground voltage line 16 provided at an outer side of the liquid crystal display panel 1, a horizontal ground voltage line 17 that extends from the ground voltage line 16 in parallel to the TFT array 13, and a vertical ground voltage line 18 that is perpendicular to the TFT array 13. A first ESD-preventing switching device 10 is connected between the ground voltage line 16 and the horizontal ground voltage line 17, thereby preventing an electrostatic discharge voltage generated from pad 6 from being delivered into a fifth ESD-preventing switching device group 15 over the ground voltage line 16.

A second ESD-preventing switching device group 14 has two parallel switching devices connected between the ground voltage line 16 and the vertical ground voltage line 18, thereby diverting an electrostatic discharge voltage applied over the vertical ground voltage line 18.

A third ESD-preventing switching device group 19 is connected between the gate line 2 and the vertical ground voltage line 18, thereby diverting an electrostatic voltage by the second ESD-preventing switching device group 14 to prevent the electrostatic voltage from being directly applied to the TFT array 13.

A fourth ESD-preventing switching device group 20 is connected between the gate pad 8 and the gate line 2, thereby diverting an electrostatic voltage on the gate line 2 to prevent the electrostatic voltage from the gate pad 8 from being directly applied to the TFT array 13.

A fifth ESD-preventing switching device group 15 is connected between the horizontal ground voltage line 17 and the TFT array 13, thereby allowing a voltage on the horizontal ground voltage line 17 to be approximately equal to a voltage on the data line 3.

A sixth ESD-preventing switching device group 22 is connected between a low gate voltage line 7 and the gate line 2, thereby allowing a voltage on the gate line 2 to be diverted by the fourth ESD-preventing switching device group 20 to be approximately equal to a voltage on the low gate voltage line 7.

A seventh ESD-preventing switching device group 21 is connected between a common voltage pad Vcom and the horizontal ground voltage line 17, thereby diverting an electrostatic voltage applied via the common voltage pad Vcom.

In FIG. 1, the first to seventh ESD-preventing switching device groups 10, 14, 19, 20, 15, 22 and 21 prevent damage to the TFT array 13 caused by an electrostatic voltage applied, via the ground voltage line 16, to the gate line 2 or the data line 3. Accordingly, the first ESD-preventing switching device 10 includes first and second TFT's 11 and 12 each having drain electrodes 11a and 12a and gate electrodes 11b and 12b respectively connected to each other. A source electrode 11c of the first TFT 11 and the drain electrode 12a of the second TFT 12 are connected to the horizontal ground voltage line 17, and the drain electrode 11a of the first TFT 11 and a source electrode 12c of the second TFT 12 are connected to the horizontal voltage line 17 that is disposed perpendicular to the ground voltage line 16.

Meanwhile, the second, third, fourth and sixth ESD-preventing switching devices 14, 19, 20 and 22 have similar configurations to provide the similar functions.

The conventional ESD preventing apparatus for the LCD has problematic in that, if excessive static electricity is supplied to the pad 6, insulation breakage of the first ESD-preventing switching device 10 occurs. Similarly, if an excessive electrostatic voltage is applied to the seventh ESD-preventing switching device 21 that is connected in series between the common voltage pad Vcom and the horizontal ground voltage line 17, insulation breakdown of the seventh ESD-preventing switching device 21 may occur. Accordingly, if the first and seventh ESD-preventing switching devices 10 and 21 undergo insulation breakage, then a large electrostatic voltage is applied to the TFT array 13, thereby causing insulation breakage of the TFT 4.

SUMMARY OF THE INVENTION

Accordingly, the present invention is directed to an electrostatic damage preventing apparatus that substantially obviates one or more of the problems due to limitations and disadvantages of the related art.

An object of the present invention is to provide an electrostatic damage preventing apparatus for a liquid crystal display that is capable of preventing insulation breakage or device damage through a single switching device connected in series to an external line of a thin film transistor array.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an electrostatic damage preventing apparatus for a thin film transistor array of a liquid crystal display includes a horizontal ground voltage line disposed at a first perimeter portion of the thin film array, a vertical ground voltage line disposed at a second perimeter portion of the thin film transistor array, and a first electrostatic damage-preventing switching device group including parallel connection of at least two electrostatic damage-preventing switching devices to divide and divert an electrostatic voltage applied over the horizontal ground voltage line.

In another aspect, an electrostatic damage preventing apparatus for a liquid crystal display includes a horizontal ground voltage line and a vertical ground voltage line arranged at an outer perimeter of a thin film transistor array, a first electrostatic damage-preventing switching device group including parallel connection of at least two electrostatic damage-preventing switching devices to divide and divert an electrostatic voltage applied over the horizontal ground voltage line, and a second electrostatic damage-preventing switching device group including parallel connection of at least two electrostatic damage-preventing switching devices to divide and divert an electrostatic voltage applied over a common voltage line.

In another aspect, a method of preventing electrostatic damage to a liquid crystal display includes the steps of dividing and diverting an electrostatic voltage applied over a horizontal ground voltage line, and dividing and diverting an electrostatic voltage applied over a common voltage line.

In another aspect, a liquid crystal display device includes a thin film transistor array, a plurality of gate lines disposed in a first direction and connected to the thin film transistors, a plurality of data lines disposed in a second direction perpendicular to the first direction and connected to the thin film transistors, a horizontal ground voltage line disposed at a first perimeter portion of the thin film transistor array, a vertical ground voltage line disposed at a second perimeter portion of the thin film transistor array, and a first electrostatic damage-preventing switching device group including parallel connection of at least two electrostatic damage-preventing switching devices to divide and divert an electrostatic voltage applied over the horizontal ground voltage line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
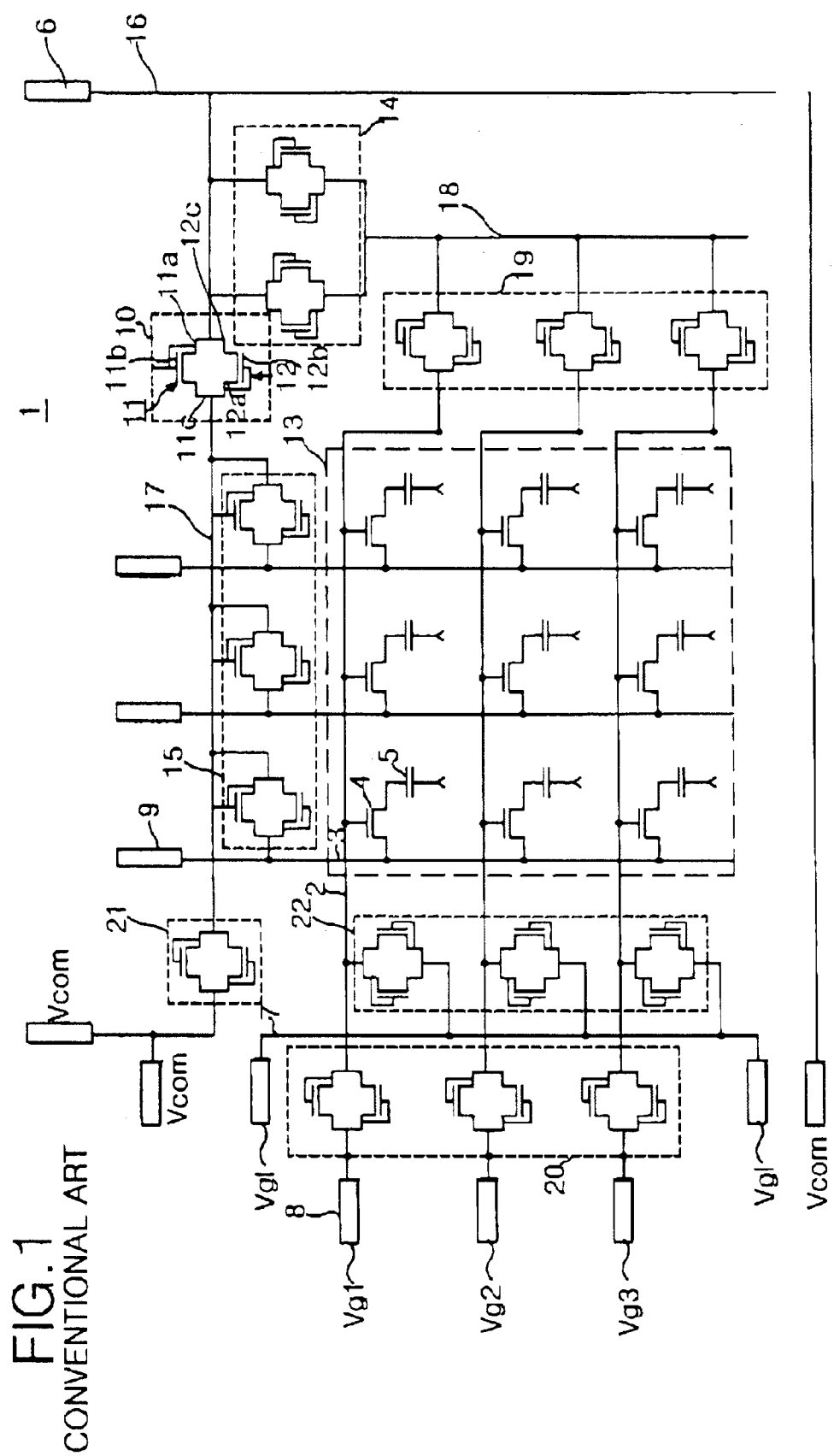
FIG. 1 is a plan view showing a configuration of a conventional electrostatic damage preventing apparatus for a liquid crystal display.
Figure 2:
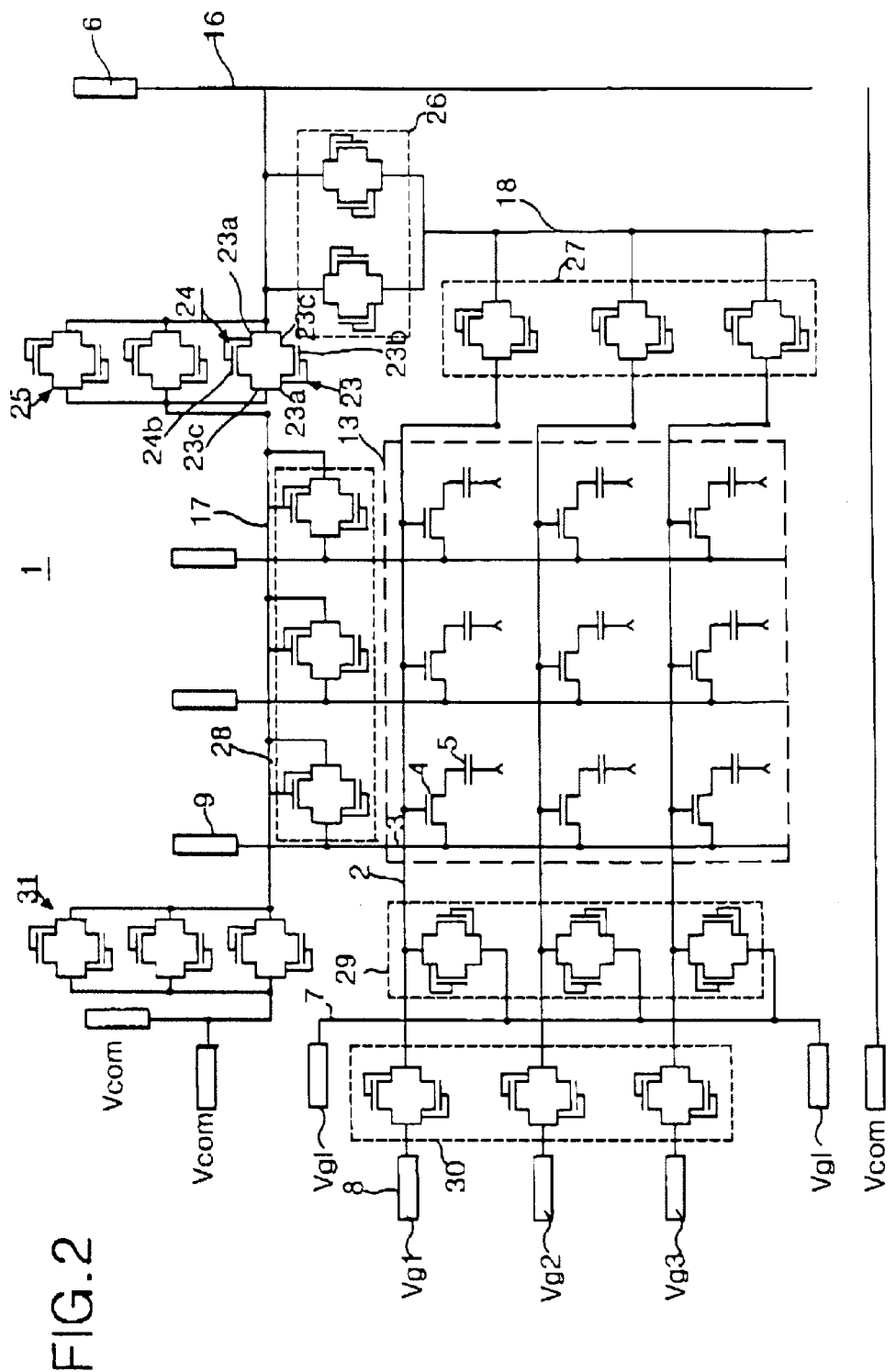
FIG. 2 is a plan view showing a configuration of an exemplary electrostatic damage preventing apparatus for a liquid crystal display according to the present invention.

In FIG. 2, elements having similar configuration and function as those in FIG. 1 are given by the same reference numerals. The ESD preventing apparatus of FIG. 2 includes first through seventh ESD-preventing switching device groups 25, 26, 27, 30, 28, 29, and 31.

The first ESD-preventing switching device group 25 is connected in parallel to a horizontal ground voltage line 17 to prevent an electrostatic voltage generated at an outer side of a liquid crystal display panel 1 from being transmitted to a TFT array 13 over a ground voltage line 16. The second ESD-preventing switching device group 26 diverts an electrostatic voltage applied over a vertical ground voltage line 18. The third ESD-preventing switching device group 27 prevents an electrostatic voltage passing through the second ESD-preventing switching device group 26 from being transmitted to the TFT array 13. The fourth ESD-preventing switching device group 30 diverts an electrostatic voltage through a gate pad 8. The fifth ESD-preventing switching device 28 allows a voltage on the horizontal ground voltage line 17 passing through the first ESD-preventing switching device group 25 to be approximately equal to a voltage on a data line 3. The sixth ESD-preventing switching device group 29 allows a voltage on a low gate line 7 to be approximately equal to a voltage on the gate line 2. The seventh ESD-preventing switching device group 31 diverts an electrostatic voltage passing through a common voltage pad Vcom.

The TFT array 13 includes liquid crystal cells that respond to an electric field for controlling a transmitted light quantity and thin film transistors (TFT's) 4 for responding to gate signals on gate lines 2 to selectively connect data lines 3 to liquid crystal cells 5 that are arranged in a matrix. The ends of the gate line 2 and the data line 3 are provided with pads 8 and 9, respectively. The pad 8 is provided at the end of the gate line 2 to receive a gate signal from a gate driver (not shown) while the pad 9 is provided at the end of the data line 4 to receive a data signal from a data driver (not shown).

The first ESD-preventing switching device group 25 is connected to the horizontal ground voltage line 17 to prevent an electrostatic voltage generated at the outer side of the liquid crystal display panel 1 from being transmitted to the TFT array 13 over the ground voltage line 16. Accordingly, the first ESD-preventing switching device group 25 includes three ESD-preventing switching devices connected in parallel to the horizontal ground voltage line 17. The three ESD-preventing switching devices each include a first transistor 23 and a second transistor 24 having drain electrodes 23a and 24a and gate electrodes 23b and 24b respectively connected to each other. Accordingly, the first ESD-preventing switching device group 25 divides an electrostatic voltage applied to the horizontal ground voltage line 17 by the number of ESD-preventing switching devices and diverts the electrostatic voltage.

The second ESD-preventing switching device group 26 includes two switching devices connected in parallel between the ground voltage line 16 and the vertical ground voltage line 18, thereby diverting an electrostatic voltage applied over the vertical ground voltage line 18.

The third ESD-preventing switching device group 27 is connected between the TFT array 13 and the vertical ground voltage line 18, thereby further diverting an electrostatic voltage that was originally diverted by the second ESD-preventing switching device group 26 to prevent the electrostatic voltage from being directly applied to the TFT array 13.

The fourth ESD-preventing switching device group 30 is connected between the gate pad 8 and the gate line 2, thereby diverting an electrostatic voltage on the gate line 2 to prevent an electrostatic voltage from the gate pad 8 from being directly applied to the TFT array 13.

The fifth ESD-preventing switching device group 28 is connected between the horizontal ground voltage line 17 and the TFT array 13, thereby allowing a voltage on the horizontal ground voltage line 17 to be approximately equal to a voltage on the data line 3.

The sixth ESD-preventing switching device group 29 is connected between a low gate voltage line 7 and the gate line 2, thereby allowing a voltage on the gate line 2 diverted by the fourth ESD-preventing switching device group 30 to be approximately equal to a voltage on the low gate voltage line 7.

The seventh ESD-preventing switching device group 31 includes at least two ESD-preventing switching devices connected between a common voltage pad Vcom and the horizontal ground voltage line 17, thereby dividing and diverting an electrostatic voltage applied via the common voltage pad Vcom.

As an example, if each of the first and seventh ESD-preventing switching device groups 25 and 31 has a parallel connection of three ESD-preventing switching devices, then an initial electrostatic voltage generated at the outer side of the liquid crystal display panel is divided by ⅓. This is because each of the first and seventh ESD-preventing switching device groups 25 and 31 includes three electrostatic preventing switching devices connected in parallel to the horizontal ground voltage line thereby increasing an overall electrostatic capacity to divert the initial electrostatic voltage. Meanwhile, an overall electrostatic capacity of the first ESD-preventing switching device group 25 having the at least three ESD-preventing switching devices becomes larger than the overall electrostatic capacity of the second ESD-preventing switching device group 26 having two ESD-preventing switching devices connected in parallel to the vertical ground voltage line 18. Accordingly, the initial electrostatic voltage is diverted to the ground voltage line via the second ESD-preventing switching device group 26 due to the relatively smaller electrostatic capacity.

Alternatively, as another example of an ESD preventing apparatus for a liquid crystal display according to the present invention, a first ESD-preventing switching device 25 as shown in FIG. 2 may be connected to the horizontal ground voltage line 17 to prevent an electrostatic voltage generated at the outer side of the liquid crystal display panel 1 from being transmitted to the TFT array 13. In this case, the first ESD-preventing switching device 25 is formed such that a width of the TFT is larger than a length of the TFT, in order to increase an electrostatic capacity value. For example, a ratio of a width to a length of the source electrode or the drain electrode of the TFT is preferably 20:20 or 30:20.

As still another example of an ESD-preventing apparatus, a first ESD-preventing switching device 25 having a high electrostatic capacity may be connected between the ground voltage line 16 and the TFT array 13 to prevent an initial electrostatic voltage generated at the outer side of the liquid crystal display panel 1 from being transmitted to the TFT array 13 via the ground voltage line 16. In this case, the first ESD-preventing switching device 25 is formed such that a width of the TFT of the first ESD-preventing switching device 25 is larger than a length thereof or such that the number of the TFT pairs of the first ESD-preventing switching device 25 is increased, thereby increasing an electrostatic capacity value.

As described above and in accordance with the present invention, the ESD-preventing switching device group having a parallel connection of at least two ESD-preventing switching devices is connected to the horizontal ground voltage line to divert an electrostatic voltage generated at the outer side of the liquid crystal display panel upon cutting of the substrate, thereby preventing insulation breakdown of a thin film transistor array and causing device damage.

It will be apparent to those skilled in the art that various modifications and variations can be made in the electrostatic damage preventing apparatus of the present invention without departing from the spirit or scope of the invention. Thus, it is intended that the present invention covers the modifications and variations of this invention provided they come within the scope of the appended claims and their equivalents.

What is claimed is:

1. An electrostatic damage preventing apparatus for a thin film transistor array of a liquid crystal display, comprising:
   a horizontal ground voltage line disposed at a first perimeter portion of the thin film transistor array;
   a vertical ground voltage line disposed at a second perimeter portion of the thin film transistor array; and
   a first electrostatic damage-preventing switching device group including parallel connection of at least three electrostatic damage-preventing switching devices to divide and divert an electrostatic voltage applied over the horizontal ground voltage line.

2. The electrostatic damage preventing apparatus according to claim 1, further comprising a second electrostatic damage-preventing switching device group including a parallel connection of electrostatic damage-preventing switching devices to divide and divert an electrostatic voltage applied over the vertical ground voltage line.

3. The electrostatic damage preventing apparatus according to claim 2, wherein an overall electrostatic capacity of the first electrostatic damage-preventing switching device group is larger than that of the second electrostatic damage-preventing switching device group.

4. The electrostatic damage preventing apparatus according to claim 2, further comprising a third electrostatic damage-preventing switching device group to divert an electrostatic voltage applied via the second electrostatic damage-preventing switching device group.

5. The electrostatic damage preventing apparatus according to claim 1, further comprising a fourth electrostatic damage-preventing switching device group to allow an electrostatic voltage diverted by the first electrostatic damage-preventing switching device group to be approximately equal to a voltage on the data line.

6. The electrostatic damage preventing apparatus according to claim 1, further comprising a fifth electrostatic damage-preventing switching device group connected between a gate pad and the gate line to divert an electrostatic voltage applied via the gate pad.

7. The electrostatic damage preventing apparatus according to claim 6, further comprising a sixth electrostatic damage-preventing switching device group to allow an electrostatic voltage diverted by the fifth electrostatic damage-preventing switching device group to be approximately equal to a voltage on a gate line.

8. The electrostatic damage preventing apparatus according to claim 1, wherein the first electrostatic damage-preventing switching device group includes thin film transistors formed such that a width of a source electrode and a width of a drain electrode of the thin film transistor is larger than a length of the thin film transistor.

9. The electrostatic damage preventing apparatus according to claim 8, wherein a ratio of the width to the length of the source electrode and the drain electrode of the TFT is one of 20:20 and 30:20.

10. An electrostatic damage preventing apparatus for a liquid crystal display, comprising:

a horizontal ground voltage line and a vertical ground voltage line arranged at an outer perimeter of a thin film transistor array;

a first electrostatic damage-preventing switching device group including parallel connection of at least two electrostatic damage-preventing switching devices to divide and divert an electrostatic voltage applied over the horizontal ground voltage line; and a second electrostatic damage-preventing switching device group including parallel connection of at least three electrostatic damage-preventing switching devices to divide and divert an electrostatic voltage applied over a common voltage line.

11. The electrostatic damage preventing apparatus according to claim 10, further comprising a third electrostatic damage-preventing switching device group including parallel connection of electrostatic damage-preventing devices to divide and divert an electrostatic voltage applied via the vertical ground voltage line.

12. The electrostatic damage preventing apparatus according to claim 10, wherein the first electrostatic damage-preventing switching device group has a parallel connection of at least three electrostatic damage-preventing switching devices.

13. The electrostatic damage preventing apparatus according to claim 11, further comprising a fourth electrostatic damage-preventing switching device group for diverting an electrostatic voltage applied via the third electrostatic damage-preventing switching device group.

14. The electrostatic damage preventing apparatus according to claim 10, further comprising a fifth electrostatic damage-preventing switching device group to allow an electrostatic voltage diverted by the first electrostatic damage-preventing switching device group to be approximately equal to a voltage on a data line.

15. The electrostatic damage preventing apparatus according to claim 10, further comprising a sixth electrostatic damage-preventing switching device group connected between a gate pad and a gate line to divert an electrostatic voltage applied via the gate pad.

16. The electrostatic damage preventing apparatus according to claim 15, further comprising a seventh electrostatic damage-preventing switching device group to allow an electrostatic voltage diverted by the sixth electrostatic damage-preventing switching device group to be approximately equal to a voltage on the gate line.

17. The electrostatic damage preventing apparatus according to claim 10, wherein each of the first and second electrostatic damage-preventing switching device groups includes thin film transistors formed such that a width of a source electrode and a width of a drain electrode of the thin film transistor is larger than a length of the thin film transistor.

18. The electrostatic damage preventing apparatus according to claim 17, wherein a ratio of the width to the length of the source electrode and the drain electrode of the TFT is one of 20:20 and 30:20.

19. The electrostatic damage preventing apparatus according to claim 10, wherein an overall electrostatic capacity of the first electrostatic damage-preventing switching device group is larger than that of the second electrostatic damage-preventing switching device group.

20. A method of preventing electrostatic damage to a liquid crystal display, comprising the steps of:

dividing and diverting an electrostatic voltage applied over a horizontal ground voltage line using at least three switching devices connected in parallel; and dividing and diverting an electrostatic voltage applied over a common voltage line.

21. The method of preventing electrostatic damage to a liquid crystal display according to claim 20, wherein the steps of dividing and diverting an electrostatic voltage include the use of switching device groups that each include parallel connection of a plurality of switching devices.

22. A liquid crystal display device, comprising:

a thin film transistor array;

a plurality of gate lines disposed in a first direction and connected to the thin film transistors;

a plurality of data lines disposed in a second direction perpendicular to the first direction and connected to the thin film transistors;

a horizontal ground voltage line disposed at a first perimeter portion of the thin film transistor array;

a vertical ground voltage line disposed at a second perimeter portion of the thin film transistor array; and a first electrostatic damage-preventing switching device group including parallel connection of at least three electrostatic damage-preventing switching devices to divide and divert an electrostatic voltage applied over the horizontal ground voltage line.

* * * * *